UNITED STATES PATENT OFFICE.

THOMAS FLETCHER, OF WARRINGTON, ENGLAND.

COMPOSITION FOR FILLING TEETH.

SPECIFICATION forming part of Letters Patent No. 226,738, dated April 20, 1880.

Application filed July 29, 1879.

*To all whom it may concern:*

Be it known that I, THOMAS FLETCHER, of Warrington, England, have invented certain new and useful Improvements in Compositions for Filling Teeth, of which the following is a specification.

This invention relates to an improved composition of matter which, when first prepared, will be in the form of a plastic mass capable of being easily worked, and which will ultimately set, forming a hard dense mass, which is specially adapted to filling decayed teeth and repairing artificial teeth, although it is applicable to other purposes where a plastic compound that will set and harden is required.

The invention consists in a composition of matter composed of an acid phosphate of tin and an earthy material with which it is capable of combining and setting into a hard mass.

In carrying out the invention the acid phosphate of tin is first prepared by dissolving wet precipitated phosphate of tin in phosphoric acid with the assistance of heat until a solution having the consistency of treacle is obtained.

The precipitation of phosphate of tin in a soluble form is always a matter of great uncertainty, and when the precipitate proves, on testing, to be sufficiently soluble it must be used at once, as it is liable to change in solubility without change in appearance.

I know at present no certain method by which a fully-soluble phosphate of tin can be uniformly produced; nor do I know any process by which an insoluble precipitate once made can be utilized or made soluble in phosphoric acid.

The solution of phosphate of tin having been prepared, a compound is then made by fusing together a mixture of one part of lime, five parts of silica, and five parts of alumina at a high temperature. When the fusing is completed the mass is allowed to cool, and is ground or otherwise reduced to fine powder. The compound thus prepared is mixed with the acid phosphate above mentioned in such proportion as to form a paste of proper consistency for the purpose to which it is applied.

In practice the proportions may be varied to suit different purposes; and hence I do not desire to limit myself to any exact proportions.

The acid phosphate and the powder should be mixed on a glass slab with a strong ivory or bone spatula until a stiff putty-like mass is obtained.

I have mentioned above one formula for the earthy compound which produces good results in combination with the acid phosphate of tin; but I do not desire to confine myself to such compound, nor the ingredients thereof, nor the proportions in which such ingredients are combined, as other materials may be employed in combination with the acid phosphate; or the materials above enumerated may be employed singly, or two of the same may be used without departing from my invention, the essential feature of which consists in a compound composed of an acid phosphate of tin in combination with an earthy powder for which it has an affinity and with which it will combine, forming a plastic mass that will set and harden.

The term "phosphoric acid," used in the specification, is understood and intended to apply to any of the forms of phosphoric acid known to chemists—*i. e.*, pyrophosphoric, orthophosphoric, or metaphosphoric acids, although I prefer the orthophosphoric acid.

What I claim is—

1. A composition of matter consisting of acid phosphate of tin combined with other materials in powder, with which it has the power of combining and setting into a hard mass, for filling decayed teeth, repairing artificial teeth, and other purposes, substantially as specified.

2. A filling material for dental purposes in which phosphate of tin is an essential ingredient.

3. A composition of matter consisting of a